United States Patent
Aoyagi et al.

(10) Patent No.: US 9,560,578 B2
(45) Date of Patent: Jan. 31, 2017

(54) MOBILE STATION

(71) Applicant: NTT DOCOMO, INC., Tokyo (JP)

(72) Inventors: Kenichiro Aoyagi, Tokyo (JP); Sadayuki Abeta, Tokyo (JP); Tetsuto Shimomura, Tokyo (JP); Atsushi Ueki, Tokyo (JP); Kota Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/403,591

(22) PCT Filed: Jul. 10, 2013

(86) PCT No.: PCT/JP2013/068856
§ 371 (c)(1),
(2) Date: Nov. 25, 2014

(87) PCT Pub. No.: WO2014/013917
PCT Pub. Date: Jan. 23, 2014

(65) Prior Publication Data
US 2015/0163727 A1 Jun. 11, 2015

(30) Foreign Application Priority Data
Jul. 20, 2012 (JP) ................ 2012-161530

(51) Int. Cl.
*H04W 48/00* (2009.01)
*H04W 48/16* (2009.01)
(Continued)

(52) U.S. Cl.
CPC ............. *H04W 48/16* (2013.01); *H04W 60/04* (2013.01); *H04W 48/12* (2013.01)

(58) Field of Classification Search
None
See application file for complete search history.

(56) References Cited

U.S. PATENT DOCUMENTS 5,889,849 A * 3/1999 Ban et al. ............ 379/230
6,625,461 B1 * 9/2003 Bertacchi ............ 455/466
(Continued)

FOREIGN PATENT DOCUMENTS

CN 101790898 A 7/2010
JP 2010-536306 A 11/2010
(Continued)

OTHER PUBLICATIONS

Written Opinion for corresponding International Application No. PCT/JP2013/068856, mailed Sep. 10, 2013 (3 pages).
(Continued)

Primary Examiner — Ashish K Thomas
(74) Attorney, Agent, or Firm — Osha Liang LLP

(57) ABSTRACT

To transmit a "CELL UPDATE message" in a radio access network not supporting "Additional Dynamic Transport Format Information for CCCH," a mobile station UE according to the present invention includes a transmitting unit 13 configured to transmit a "CELL UPDATE message" to a radio access network in a "CELL UPDATE procedure," and the transmitting unit 13 includes a predetermined information element in the "CELL UPDATE message" only when the radio access network supports the "Additional Dynamic Transport Format Information for CCCH."

3 Claims, 2 Drawing Sheets

(51) Int. Cl.
*H04W 60/04* (2009.01)
*H04W 48/12* (2009.01)

(56) References Cited

U.S. PATENT DOCUMENTS

| | | | | |
|---|---|---|---|---|
| 6,724,813 | B1* | 4/2004 | Jamal et al. | 375/219 |
| 6,810,019 | B2* | 10/2004 | Steudle | 370/252 |
| 6,901,060 | B1* | 5/2005 | Lintulampi | 370/329 |
| 7,010,317 | B2* | 3/2006 | Hwang et al. | 455/522 |
| 7,266,107 | B2* | 9/2007 | Choi et al. | 370/341 |
| 7,283,492 | B2* | 10/2007 | Malladi et al. | 370/328 |
| 7,535,885 | B2* | 5/2009 | Horneman et al. | 370/342 |
| 7,580,388 | B2* | 8/2009 | Kim | 370/329 |
| 7,672,261 | B2* | 3/2010 | Lee et al. | 370/312 |
| 8,060,122 | B2* | 11/2011 | Tseng | H04W 76/048 455/458 |
| 2004/0203714 | A1* | 10/2004 | Van Lieshout et al. | 455/423 |
| 2008/0186893 | A1* | 8/2008 | Kolding | H04W 52/0235 370/311 |
| 2008/0188220 | A1* | 8/2008 | DiGirolamo et al. | 455/434 |
| 2009/0052376 | A1* | 2/2009 | Cave et al. | 370/328 |
| 2009/0168728 | A1* | 7/2009 | Pani et al. | 370/332 |
| 2009/0196197 | A1* | 8/2009 | DiGirolamo | H04L 12/2602 370/252 |
| 2009/0203376 | A1* | 8/2009 | Sambhwani | H04J 11/0069 455/434 |
| 2009/0275337 | A1 | 11/2009 | Maeda et al. | |
| 2010/0120420 | A1* | 5/2010 | Agashe | H04W 36/0033 455/432.1 |
| 2011/0222457 | A1* | 9/2011 | Lee | H04W 28/06 370/312 |
| 2012/0071177 | A1* | 3/2012 | Hung | H04W 76/048 455/458 |
| 2012/0124088 | A1* | 5/2012 | Meshkati | H04W 48/16 707/771 |
| 2014/0022989 | A1* | 1/2014 | Chakravarthy | H04W 60/02 370/328 |
| 2016/0112373 | A1* | 4/2016 | Sheik | H04L 63/205 455/410 |

FOREIGN PATENT DOCUMENTS

| | | |
|---|---|---|
| JP | 2011-139330 A | 7/2011 |
| WO | 2006/103823 A1 | 10/2006 |
| WO | 2009/023497 A2 | 2/2009 |

OTHER PUBLICATIONS

Notice of Grounds for Rejection for corresponding Japanese Application No. 2012-161530, mailed Sep. 17, 2013 (8 pages).
Zte et al.; "Wayfoward for adding up Rel-7 missing optional capabilities;" 3GPP TSG-RAN WG2 meeting #76, R2-115742; San Francisco, USA; Nov. 14-18, 2011 (11 pages).
3GPP TS 25.331 V11.2.0; "3rd Generation Partnership Project; Technical Specification Group Radio Access Network; Radio Resource Control (RRC); Protocol specification (Release 11);" Jun. 2012 (1944 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Sep. 2012 (205 pages).
3GPP TS 36.331 V11.1.0; "3rd Generation Partnership Project; Technical Specification Group Radio Access Network; Evolved Universal Terrestrial Radio Access (E-UTRA); Radio Resource Control (RRC); Protocol Specification (Release 11);" Sep. 2012 (325 pages).
International Search Report for corresponding International Application No. PCT/JP2013/068856, mailed Sep. 10, 2013 (2 pages).
First Office Action issued in the counterpart Chinese Patent Application No. 201380038597.2, mailed Aug. 27, 2015 (12 pages).
Extended European Search Report issued in the counterpart European Patent Application No. 13819628.2, mailed Nov. 19, 2015 (6 pages).
MediaTek; "Multi-PLMN support"; 3GPP TSG-RAN2 Meeting #78, R2-122812; Prague, Czech Republic; May 21-25, 2012 (37 pages).
NTT DOCOMO et al; "Clarification of the IE setting in Cell Update message when Additional RACH TFS for CCCH is not configured"; 3GPP TSG-RAN WG2 Meeting #79, R2-123663; Qingdao, China; Aug. 13-17, 2012 (8 pages).

* cited by examiner

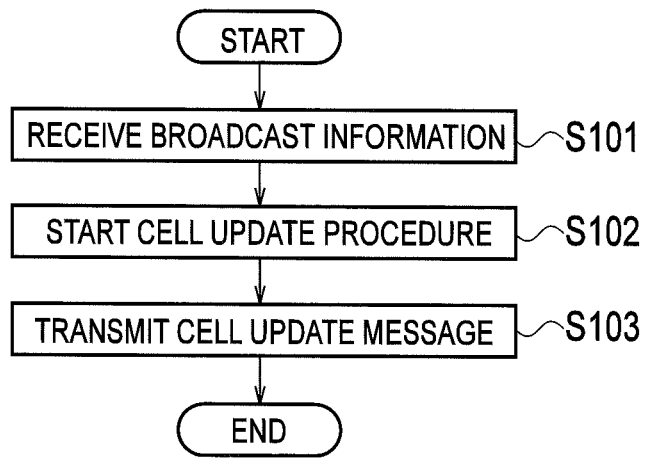
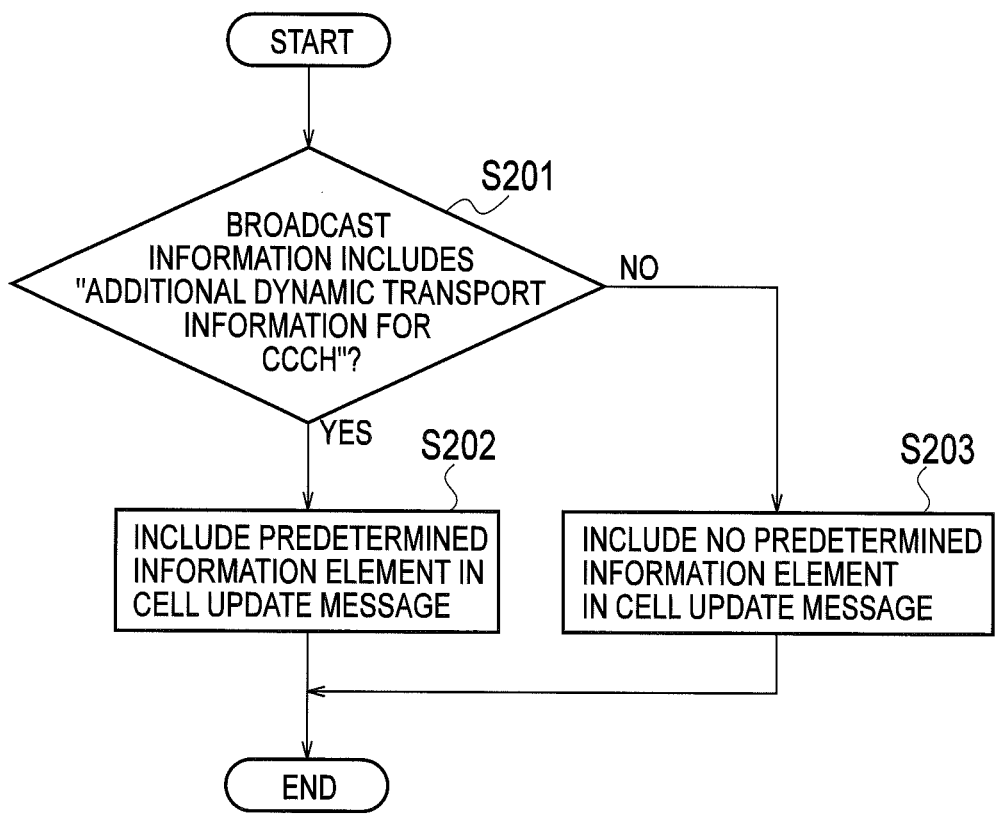

MOBILE STATION

TECHNICAL FIELD

The present invention relates to a mobile station.

BACKGROUND ART

Conventionally, in a UTRAN (Universal Terrestrial Radio Access Network) scheme of Release 0.6, mobile stations UE are configured to transmit a "CELL UPDATE message" to a radio access network in a "CELL UPDATE procedure."

In the conventional UTRAN scheme of Release.6, the maximum amount of data that a mobile station UE can transmit with a "CELL UPDATE message" in a radio access network is specified to be 20 bytes.

Here, in the conventional UTRAN scheme of Release.6, a function called "Additional Dynamic Transport Format Information for CCCH" is specified. In a radio access network supporting such a function, mobile stations UE supporting the function are configured to be capable of creating and transmitting a "CELL UPDATE message" including an information element with a data amount of 20 bytes or more.

PRIOR ART DOCUMENT

Non-Patent Document

Non-patent document 1: 3GPP TS25.331

SUMMARY OF THE INVENTION

However, in the conventional UTRAN scheme of Release.6, since mobile stations UE supporting the "Additional Dynamic Transport Format Information for CCCH" are configured to create a "CELL UPDATE message" including an information element with a data amount of 20 bytes or more, there has been a problem in that such a "CELL UPDATE message" cannot be transmitted in a radio access network not supporting the "Additional Dynamic Transport Format Information for CCCH."

Thus, the present invention has been made in view of the above-mentioned problem, and an object thereof is to provide a mobile station supporting the "Additional Dynamic Transport Format Information for CCCH" and configured to be capable of transmitting a "CELL UPDATE message" in a radio access network not supporting the "Additional Dynamic Transport Format Information for CCCH."

A first feature of the present invention is summarized as a mobile station, comprising a transmitting unit configured to transmit a predetermined message to a radio access network by using a common control channel, the transmitting unit being configured to transmit the predetermined message with a predetermined information element included therein only when the radio access network supports an additional transport format for common control channel.

BRIEF DESCRIPTION OF THE DRAWINGS

FIG. 3 is a flowchart showing the operation of the mobile station according to the first embodiment of the present invention.

FIG. 4 is a flowchart showing the operation of the mobile station according to the first embodiment of the present invention.

MODE FOR CARRYING OUT THE INVENTION

Mobile Communication System According to First Embodiment of Present Invention

A mobile communication system according to a first embodiment of the present invention will be described with reference to FIGS. 1 to 4.

This embodiment will be described by taking a mobile communication system of a UTRAN scheme as an example. However, the present invention is not limited to such a mobile communication system and is applicable to mobile communication systems of other schemes.

Figure 1:
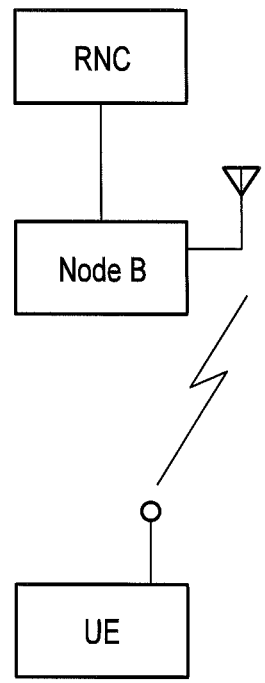
FIG. 1 is an overall configuration diagram of a mobile communication system according to a first embodiment of the present invention.

As shown in FIG. 1, the mobile communication system according to this embodiment includes a radio network controller RNC and a radio base station NodeB within a radio access network.

Here, a mobile station UE according to this embodiment supports "Additional Dynamic Transport Format Information for CCCH."

Figure 2:
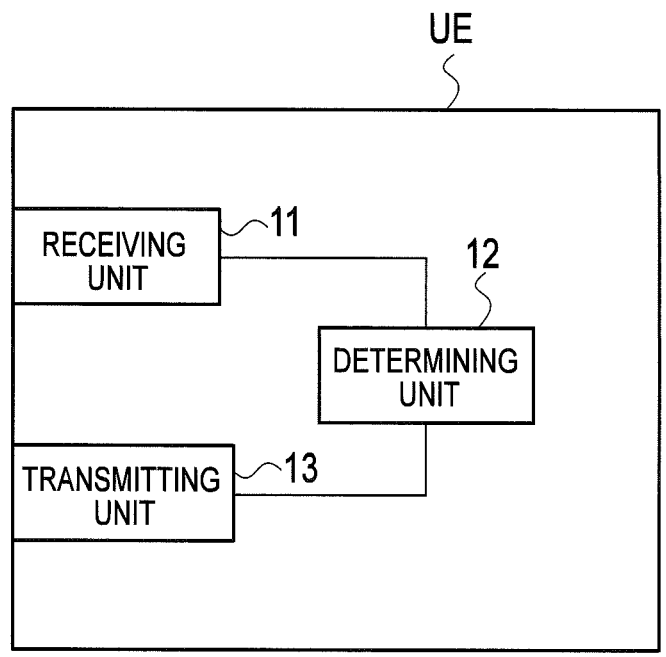
FIG. 2 is a functional block diagram of a mobile station according to the first embodiment of the present invention.

As shown in FIG. 2, the mobile station UE includes a receiving unit 11, a determining unit 12, and a transmitting unit 13.

The receiving unit 11 is configured to receive a dedicated signal and broadcast information from the radio access network.

The determining unit 12 is configured to determine whether or not the radio access network supports the "Additional Dynamic Transport Format Information for CCCH."

For example, the determining unit 12 may be configured to determine that the radio access network supports "Additional Dynamic Transport Format Information for CCCH" when broadcast information received by the receiving unit 11 includes an information element "Additional Dynamic Transport Format Information for CCCH."

Alternatively, the determining unit 12 may be configured to determine that the radio access network supports the "Additional Dynamic Transport Format Information for CCCH" when a dedicated signal received by the receiving unit 11 includes the information element "Additional Dynamic Transport Format Information for CCCH."

Alternatively, the determining unit 12 may be configured to determine whether or not the radio access network supports the "Additional Dynamic Transport Format Information for CCCH" on the basis of the release which the radio access network supports.

For example, the determining unit 12 may be configured to determine that the radio access network does not support the "Additional Dynamic Transport Format Information for CCCH" when the release which the radio access network supports is a release previous to "Release.6."

Alternatively, the determining unit 12 may be configured to determine whether or not the radio access network supports the "Additional Dynamic Transport Format Information for CCCH" on the basis of PLMN (Public Land Mobile Network, operator information).

The transmitting unit 13 is configured to transmit various types of messages to the radio access network.

For example, the transmitting unit 13 is configured to transmit a "CELL UPDATE message" to the radio access network by using a CCCH (Common Control Channel) in a "CELL UPDATE procedure."

Here, the transmitting unit 13 may be configured to transmit a predetermined message (e.g., a "CELL UPDATE message," an "RRC CONNECTION REQUEST," or the like) with a predetermined information element included therein only when the radio access network supports the "Additional Dynamic Transport Format Information for CCCH."

Hereinbelow, the description will be given based on a case where a "CELL UPDATE message" is used as the predetermined message.

Such an information element is an information element which is not specified in an existing transport format (TF), i.e., the transport format of "CELL UPDATE messages" to be transmitted by mobile stations UE which do not support the "Additional Dynamic Transport Format Information for CCCH," but is specified in the transport format of "CELL UPDATE messages" to be transmitted by mobile stations UE which support the "Additional Dynamic Transport Format Information for CCCH."

For example, such a predetermined information element is assumed to be "HS-PDSCH(High Speed-Physical Downlink Shared Channel) in CELL_FACH (Forward Access Channel)," "Support of common E-DCH (Enhanced-Dedicated Channel)," "Support for Two DRX (Discontinuous Reception) scheme in URA_PCH (Paging Channel) and CELL_PCH," "Support for MAC (Media Access Control)-i/is," "Support of HS-DSCH (High Speed-Downlink Shared Channel) DRX operation," "Support of SPS(Semi-Persistent Scheduling) operation," "Support of control channel DRX operation," or the like.

More specifically, the transmitting unit 13 may be configured to transmit a "CELL UPDATE message" with the predetermined information element included therein only when the mobile station UE has a predetermined capability and the radio access network supports the "Additional Dynamic Transport Format Information for CCCH," the predetermined information element indicating that the mobile station UE has the predetermined capability.

For example, the transmitting unit 13 may be configured to transmit a "CELL UPDATE message" with the information element "HS-PDSCH in CELL_FACH" included therein only when the mobile station UE has, as its predetermined capability, a capability to support HS-PDSCH reception in a CELL_FACH state and the radio access network supports the "Additional Dynamic Transport Format Information for CCCH."

Moreover, the transmitting unit 13 may be configured to transmit a "CELL UPDATE message" with the information element "Support of common E-DCH" included therein only when the mobile station UE has, as its predetermined capability, a capability to support EUL (Enhanced Uplink) in a CELL_FACH state and the radio access network supports the "Additional Dynamic Transport Format Information for CCCH."

Moreover, the transmitting unit 13 may be configured to transmit a "CELL UPDATE message" with the information element "Support for Two DRX scheme in URA_PCH and CELL_PCH" included therein only when the mobile station UE has, as its predetermined capability, a capability to support "Two DRX" in a URA-PCH state and a CELL_FACH state and the radio access network supports the "Additional Dynamic Transport Format Information for CCCH."

Moreover, the transmitting unit 13 may be configured to transmit a "CELL UPDATE message" with the information element "Support for MAC-i/is" included therein only when the mobile station UE has, as its predetermined capability, a capability to support "MAC-i/is" and the radio access network supports the "Additional Dynamic Transport Format Information for CCCH."

Moreover, the transmitting unit 13 may be configured to transmit a "CELL UPDATE message" with the information element "Support of HS-DSCH DRX operation" included therein only when the mobile station UE has, as its predetermined capability, a capability to support HS-DSCH DRX operation in a CELL_FACH state and the radio access network supports the "Additional Dynamic Transport Format Information for CCCH."

Moreover, the transmitting unit 13 may be configured to transmit a "CELL UPDATE message" with the information element "Support of SPS operation" included therein only when the mobile station UE has, as its predetermined capability, a capability to support SPS operation and the radio access network supports the "Additional Dynamic Transport Format Information for CCCH."

Moreover, the transmitting unit 13 may be configured to transmit a "CELL UPDATE message" with the information element "Support of control channel DRX operation" included therein only when the mobile station UE has, as its predetermined capability, a capability to support control channel DRX operation in a CELL_FACH state and the radio access network supports the "Additional Dynamic Transport Format Information for CCCH."

Note that the transmitting unit 13 may be configured to transmit a predetermined message (e.g., a "CELL UPDATE message") with no predetermined information element included therein when the radio access network does not support the "Additional Dynamic Transport Format Information for CCCH."

Hereinbelow, the operation of the mobile station according to this embodiment will be described with reference to FIGS. 3 and 4.

As shown in FIG. 3, in step S101, the mobile station UE receives broadcast information (or a dedicated signal) from the radio access network.

Here, the mobile station UE stores the result of determination as to whether or not the broadcast information (or the dedicated signal) includes the information element "Additional Dynamic Transport Format Information for CCCH," i.e., the result of determination as to whether or not the radio access network supports the "Additional Dynamic Transport Format Information for CCCH"

The mobile station UE starts a "CELL UPDATE procedure" in step S102 and then transmits a "CELL UPDATE message" to the radio access network in step S103.

Here, as shown in FIG. 4, if determining that the broadcast information (or the dedicated signal) includes the information element "Additional Dynamic Transport Format Information for CCCH" (YES in step S201), the mobile station UE includes the above-mentioned predetermined information element in the "CELL UPDATE message" in step S202.

On the other hand, if determining that the broadcast information (or the dedicated signal) does not include the information element "Additional Dynamic Transport Format Information for CCCH" (NO in step S201), the mobile station UE does not include the above-mentioned predetermined information element in the "CELL UPDATE message" in step S203.

According to the mobile communication system according to this embodiment, the mobile station UE supporting the "Additional Dynamic Transport Format Information for CCCH" can create a "CELL UPDATE message" without the predetermined information element included therein, that is, the mobile station UE can keep the information element to be included in the "CELL UPDATE message" at or below 20 bytes. Thus, a "CELL UPDATE message" can be transmitted in the radio access network not supporting the "Additional Dynamic Transport Format Information for CCCH."

Moreover, according to the mobile communication system according to this embodiment, both mobile stations UE which support the "Additional Dynamic Transport Format Information for CCCH" and mobile stations UE which do not support the "Additional Dynamic Transport Format Information for CCCH" can be mixed without requiring all the radio access networks to support the "Additional Dynamic Transport Format Information for CCCH." Thus, it is possible to avoid increase in the cost for modifying radio access networks.

The features of this embodiment described above may be expressed as follows.

A first feature of this embodiment is summarized as a mobile station UE including a transmitting unit 13 configured to transmit a predetermined message (e.g., a "CELL UPDATE message") to a radio access network, the transmitting unit 13 being configured to transmit the predetermined message with a predetermined information element (e.g., "HS-PDSCH in CELL_FACH") included therein only when the radio access network supports the "Additional Dynamic Transport Format Information for CCCH (an additional transport format for common control channel)."

In the first feature of this embodiment, the transmitting unit 13 may be configured to transmit in the predetermined message with a predetermined information element included therein only when the mobile station UE has a predetermined capability and the radio access network supports the "Additional Dynamic Transport Format Information for CCCH," the predetermined information element indicating that the mobile station UE has the predetermined capability.

In the first feature of this embodiment, the mobile station UE may further include a receiving unit 11 configured to receive broadcast information from the radio access network, and a determining unit 12 configured to determine whether or not the radio access network supports the "Additional Dynamic Transport Format Information for CCCH," and the determining unit 12 may be configured to determine that the radio access network supports the "Additional Dynamic Transport Format Information for CCCH" when the broadcast information includes the information element "Additional Dynamic Transport Format Information for CCCH" (an information element indicating that the radio access network supports an additional transport format for common control channel).

In the first feature of this embodiment, the mobile station UE may include a receiving unit 11 configured to receive a dedicated signal from the radio access network, and a determining unit 12 configured to determine whether or not the radio access network supports the "Additional Dynamic Transport Format Information for CCCH," and the determining unit 12 may be configured to determine that the radio access network supports the "Additional Dynamic Transport Format Information for CCCH" when the dedicated signal includes the information element "Additional Dynamic Transport Format Information for CCCH."

In the first feature of this embodiment, the mobile station UE may include a determining unit 12 configured to determine whether or not the radio access network supports the "Additional Dynamic Transport Format Information for CCCH" on the basis of the release which the radio access network supports or on the basis of the PLMN (operator information).

In the first feature of this embodiment, the transmitting unit 13 may be configured to transmit the predetermined message with no predetermined information element included therein when the radio access network does not support the "Additional Dynamic Transport Format Information for CCCH."

It should be noted that the foregoing operations of the mobile station UE and the radio base station NodeB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE or the radio base station NodeB. Otherwise, the storage medium and the processor may be provided as discrete components inside the mobile station UE or the radio base station NodeB.

Hereinabove, the present invention has been described in detail by use of the foregoing embodiment. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161530 (filed on Jul. 20, 2012) is incorporated by reference in the present specification.

INDUSTRIAL APPLICABILITY

As described above, according to the present invention, it is possible to provide a mobile station supporting the "Additional Dynamic Transport Format Information for CCCH" and configured to be capable of transmitting a "CELL UPDATE message" in a radio access network not supporting the "Additional Dynamic Transport Format Information for CCCH."

EXPLANATION OF THE REFERENCE NUMERALS

RNC radio network controller
NodeB radio base station
UE mobile station
11 receiving unit
12 determining unit
13 transmitting unit

The invention claimed is:

1. A mobile station, comprising circuitry configured to:
   transmit a CELL UPDATE message to a radio access network by using a common control channel,
   receive broadcast information from the radio access network; and
   determine whether or not the radio access network supports an additional transport format for the common control channel based on the broadcast information,
   wherein the circuitry determines that the radio access network supports the additional transport format for the common control channel when the broadcast information includes an information element indicating support of the additional transport format for common control channel,
   wherein when the circuitry determines that the radio access network supports the additional transport format for common control channel, the CELL UPDATE message comprises a predetermined information element,
   wherein when the circuitry determines that the radio access network supports the additional transport format for common control channel, the predetermined information element is transmitted as an information element specified by a transport format of the CELL UPDATE message,
   wherein when the circuitry determines that the radio access network does not support the additional transport format for common control channel, the CELL UPDATE message does not comprise the predetermined information element, and
   the predetermined information element is "Support for Two DRX scheme in URA_PCH".

2. The mobile station according to claim 1, wherein the circuitry determines whether or not the radio access network supports the additional transport format for common control channel based on a release which the radio access network supports or based on operator information.

3. The mobile station according to a claim 1, wherein the circuitry stores the result of determination as to whether or not the broadcast information includes the information element indicating support of the additional transport format for common control channel, when the circuitry receives the broadcast information.

* * * * *